(12) United States Patent
Rhee et al.

(10) Patent No.: US 8,103,974 B2
(45) Date of Patent: Jan. 24, 2012

(54) EVENT DISPLAY APPARATUS AND METHOD

(75) Inventors: Young-ho Rhee, Seoul (KR); Jae-hwan Kim, Suwon-si (KR); Chul-hwan Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 932 days.

(21) Appl. No.: 11/682,472

(22) Filed: Mar. 6, 2007

(65) Prior Publication Data
US 2007/0237032 A1 Oct. 11, 2007

(30) Foreign Application Priority Data
Apr. 10, 2006 (KR) .................. 10-2006-0032410

(51) Int. Cl.
G06F 3/17 (2006.01)
G06F 3/14 (2006.01)

(52) U.S. Cl. ........ 715/864; 715/716; 715/764; 715/775; 715/810; 715/866; 345/169; 345/473; 340/309.7

(58) Field of Classification Search .......... 715/200–277; 700/701–866; 709/201–229; 705/50–79; 345/30–111; 348/44, 206–231.9
See application file for complete search history.

(56) References Cited

U.S. PATENT DOCUMENTS

| | | | | |
|---|---|---|---|---|
| 5,936,625 A * | 8/1999 | Kahl et al. | ................. | 715/775 |
| 6,522,342 B1 * | 2/2003 | Gagnon et al. | ................. | 715/716 |
| 6,621,508 B1 * | 9/2003 | Shiraishi et al. | ................. | 715/810 |
| 6,809,724 B1 * | 10/2004 | Shiraishi et al. | ................. | 345/169 |
| 6,952,221 B1 * | 10/2005 | Holtz et al. | ................. | 715/723 |
| 7,109,848 B2 * | 9/2006 | Schybergson | ................. | 340/309.7 |
| 7,336,279 B1 * | 2/2008 | Takiguchi | ................. | 345/473 |
| 7,600,245 B2 * | 10/2009 | Steading et al. | ................. | 725/52 |
| 7,639,254 B2 * | 12/2009 | Takiguchi et al. | ................. | 345/428 |
| 2008/0065974 A1 * | 3/2008 | Campbell | ................. | 715/200 |
| 2008/0066018 A1 * | 3/2008 | Zinn et al. | ................. | 715/866 |
| 2008/0098313 A1 * | 4/2008 | Pollack | ................. | 715/753 |
| 2008/0178100 A1 * | 7/2008 | May et al. | ................. | 715/764 |

FOREIGN PATENT DOCUMENTS

| | | |
|---|---|---|
| KR | 2005-77439 | 8/2005 |
| KR | 2006-7955 | 1/2006 |

OTHER PUBLICATIONS

"Beyond Contacts: Getting Started Manual" DataViz, Inc, 2004.

* cited by examiner

*Primary Examiner* — Ruay Ho
(74) *Attorney, Agent, or Firm* — NSIP Law

(57) ABSTRACT

An event display apparatus includes a configuration unit to configure a screen to include a time region, which is divided by time intervals along a first axis into a plurality of sub-time regions, and an event region, which is divided by event into a plurality of sub-event regions, in parallel to the first axis; and an output unit to output time slots, which has been allocated according to one or more zones, in the respective sub-time regions along the first axis, and to output sub-event regions comprising event information of different types, which correspond to the set time slots, in parallel to the first axis.

29 Claims, 9 Drawing Sheets

EVENT DISPLAY APPARATUS AND METHOD

CROSS-REFERENCE TO RELATED APPLICATION

This application claims the benefit of Korean Application No. 2006-32410, filed Apr. 10, 2006 in the Korean Intellectual Property Office, the disclosure of which is incorporated herein by reference.

BACKGROUND OF THE INVENTION

1. Field of the Invention

Aspects of the present invention relate to an event display apparatus and method, and more particularly, to an event display apparatus and method which can increase efficiency and convenience in managing personal records of a user by effectively configuring and displaying event information on a screen of an apparatus, such as a mobile communication terminal.

2. Description of the Related Art

Recently, the scope of use of mobile communication terminals has expanded from only communication-oriented use (such as calling and short message service (SMS)) to wider uses (such as storing individuals' daily schedules or information and generating and/or storing of music or photographs). That is, mobile communication terminals have evolved from simple communication devices into tools to manage personal records and to create contents.

Mobile phones with various functions have been introduced. The functions provided by the mobile phones generally include SMS, multimedia message service (MMS), call history, photo, e-mail, and Web connection. In addition, the mobile phones support a personal information management system (PIMS) and a micro-payment function. The PIMS, in turn, supports various functions, such as a simple memo in a text form, keeping anniversary dates, name card management, keeping appointment times, schedule management, calendar, and calculator.

However, since contents of various events that occur to a user are not effectively managed in mobile communication terminals, it is difficult for the users to conveniently check information regarding events that occur according to each time slot. That is, to check on events that occurred, users have to access each menu and click on each item in each of the menu in order to check information regarding events that occurred in a day. Therefore, if a large number of various events occurred in the day, it is that much difficult for the users to check information regarding the events.

For example, if events such as a text message received at a certain time slot, information regarding a micro-payment, photographic information, and schedule management, occurred in the day, the user has to access each menu and click on each item in each menu in order to check the information regarding the events. Hence, it is difficult for the user to collectively and efficiently manage the events.

In order to eliminate or reduce such inconvenience, there is a need for the user to utilize event information more effectively, to thereby increase efficiency and convenience in managing the contents of the various events.

SUMMARY OF THE INVENTION

Aspects of the present invention include an event display apparatus and method.

According to an aspect of the present invention, an event display apparatus includes a configuration unit to configure a screen to include a time region, which is divided by time intervals along a first axis into a plurality of sub-time regions, and an event region, which is divided by event into a plurality of sub-event regions, in parallel to the first axis; and an output unit to output time slots, which have been allocated according to one or more zones, in the respective sub-time regions along the first axis, and to output sub-event regions comprising event information of different types, which correspond to the output time slots, in parallel to the first axis.

According to another aspect of the present invention, an event display method includes configuring a screen to include a time region, which is divided by time intervals along a first axis into a plurality of sub-time regions, and an event region, which is divided by event into a plurality of sub-event regions, in parallel to the first axis; and outputting time slots, which has been allocated according to one or more zones, in the respective sub-time regions along the first axis, and outputting sub-event regions comprising event information of different types, which correspond to the output time slots, in parallel to the first axis.

According to another aspect of the present invention, a method of displaying one or more events on a display, includes arranging one or more events of different types according to at least one predetermined time slot that corresponds to a time when the one or more events occurred, and displaying the one or more events of different types in an event slot that corresponds to the at least one predetermined time slot.

According to another aspect of the present invention, an apparatus to display one or more events on a display, includes an arranging unit to arrange one or more events of different types according to at least one predetermined time slot that corresponds to a time when the one or more events occurred, and a displaying unit to display the one or more events of different types in an event slot that corresponds to the at least one predetermined time slot.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIGS. 8A and 8B illustrate screens to set preference marks according to aspects of the present invention.

DETAILED DESCRIPTION OF THE EMBODIMENTS

Figure 1:
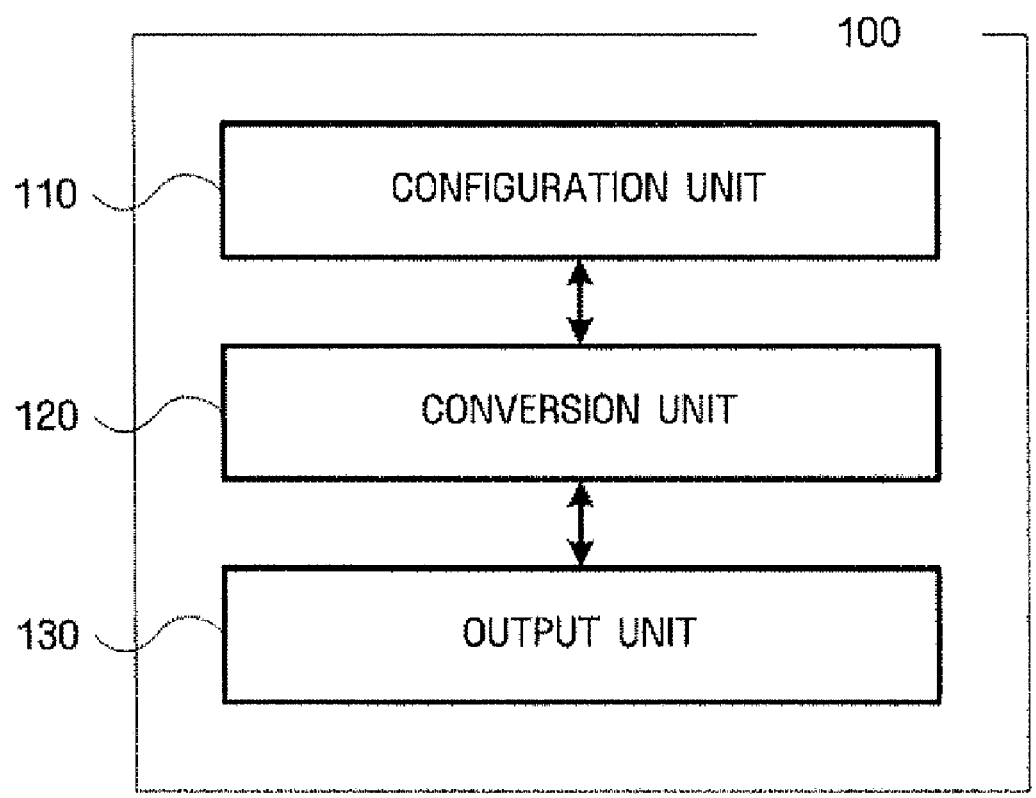
FIG. 1 is a block diagram of an event display apparatus of a mobile communication terminal according to an aspect of the present invention.

Reference will now be made in detail to the aspects of the present invention, examples of which are illustrated in the accompanying drawings, wherein like reference numerals refer to the like elements throughout. The aspects are described below in order to explain the present invention by referring to the figures.

FIG. 1 is a block diagram of an event display apparatus 100 of a mobile communication terminal according to an aspect of the present invention. Referring to FIG. 1, the event display apparatus 100 includes a configuration unit 110, a conversion unit 120, and an output unit 130. In the non-limiting aspect shown, the configuration unit 110 configures a screen including (or to include) a time region and an event region. The time region is divided by time intervals along a first axis into a plurality of sub-time regions. The event region is divided by event into a plurality of sub-event regions, in parallel to the first axis.

Figure 3:
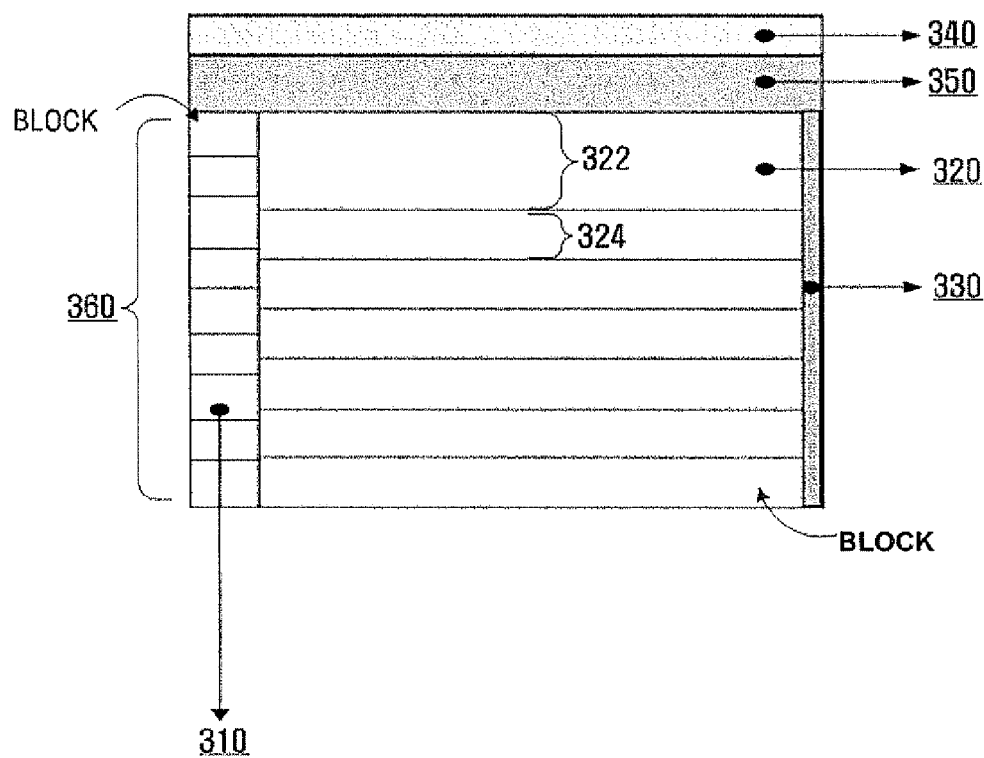
FIG. 3 illustrates screen configuration of a mobile communication terminal according to an aspect of the present invention.

For example, event information may be displayed in each corresponding sub-event region of the event region using (or extend over) a plurality of axes (first and second axes). The first axis may include (or may be continued over) event and/or scroll regions, and the second axis may include (or may be continued over) state, title, and/or information regions. In other aspects, other regions or something similar may be included or contained over the first and second axes. Further, the axes can be otherwise oriented and need not be orthogonal as shown in the example of FIG. 3.

The time region, which is divided by time intervals, may include allocated zones, and a time slot may be set according to each zone. The event region, which is divided by event in parallel to the first axis, includes event information generated at the time slots which are set according to the allocated zones of the time region. The time region, which is divided by time intervals, may include 12 blocks, and the event region, which is divided by event in parallel to the first axis, may include 8 blocks. The blocks denotes each of the sub-time regions into which the time region is/was divided by time intervals and/or each of the sub-event regions into which the event region is/was divided by event. However, the number of the blocks is not so limited, and can be adjusted.

Each block of the time region may be filled with a time (time slot or time frame), and each block of the event region may be formed (displayed or output) at a predetermined ratio (e.g., a ratio of 1.5 to 1) relative to the size of a corresponding block of the time region in order to effectively represent event information thereof. Here, a user may set zones of the time region and time slots for the zones using a predetermined setting menu. Also, the ratio of the size of each block of the event region relative to that of the corresponding block of the time region may be automatically adjusted according to a set (or a predetermined) value. Setting the zones of the time region and time slots for the zones will be described in greater detail later with reference to FIG. 5. In addition, the screen configuration of the apparatus, such as the mobile communication terminal will be described in greater detail later with reference to FIG. 3, and a detailed description thereof will not be discussed here. Although referred to as a mobile communication terminal, the apparatus of this invention includes telephones, mobile audio/video devices, PDA's, and/or like handheld devices. It is understood that aspects of the present invention can be implemented on portable and/or non-portable computers in other aspects.

The user may give significance (or importance) to desired event information using a preference mark, such as an asterisk. For example, the user may mark information regarding events (such as text messages and calls) generated by a certain entity (such as a selected sender) as preferred (or important) event information by using the configuration unit 110. Then, the user may sort the marked event information of a corresponding screen, bundle the marked event information, and output the bundled event information on (or to) the output unit 130. Alternatively, the user may output the marked event information on the output unit 130 separately from other event information (that may not be marked). Setting the preference mark will be described in greater detail later with reference to FIG. 8. Accordingly, a detailed description thereof will not be discussed here.

In the non-limiting aspect shown, the conversion unit 120 converts event information selected by the user into event information that may include a thumbnail image. The thumbnail image is a smaller and more concise version of an original image (and/or a digest or a representation of the event information) and enables a viewer to guess the content of the corresponding event (or event information). For example, when a text message is received from an entity (or a sender), and if information regarding the event (i.e., the text message) is selected, a picture of the entity may be provided in the form of a thumbnail image.

That is, event information in the event region selected by a user is displayed as event information that includes a thumbnail image and the other event information (which is not selected by the user) is displayed in the form of a simple list. In this case, first event information at a time (or time slot) selected by the user may be converted into event information that includes a thumbnail and be displayed accordingly. In addition, whenever the user moves between event information, an existing list (or event information which did not include a thumbnail) is converted into event information that includes a thumbnail image and be displayed accordingly. Event information, which is not selected (or de-selected) by the user, may be converted back into the simple list and be displayed accordingly, though not required. While shown as a thumbnail, it is understood that other image data could be displayed, including animated images.

Therefore, as the user moves to the event information of a time slot, the event information that is displayed in the form of the list (or list format) may be converted into event information. By way of example, the event information that can include a thumbnail image, and the thumbnail image may be enlarged and be displayed accordingly. In addition, a block for the event information that includes the thumbnail image may be 1.5 to 2 times the size of a block for the event information that is in the form of a list and may be output accordingly on the output unit 130. However, it is understood that the event information is not so limited, and can include audio, video, and/or text information.

The output unit 130 outputs time slots, which are set for (or according to) allocated zones, in the respective sub-time regions of the time region along the first axis. The output unit 130 further outputs the sub-event regions, which are composed of (or comprises) event information that correspond to the output time slots, in parallel to the first axis.

For example, when time slots set for the allocated zones are output in the time region by regular time intervals along the first axis, the entire time region may be displayed as a particular zone (e.g., a first or second zone) on the first axis.

Alternatively, part of the time region may be allocated to the first or second zone so that a plurality of zones may be displayed together.

In the output time region, sub-time regions, which do not have corresponding event information, are deactivated and output accordingly. In addition, sub-event regions, which are composed of (or comprises) event information that correspond to time slots that are unselected by the user, are deactivated and output accordingly.

A time (time frame or time slot) selected by a user may be represented in various forms (or formats). Examples include highlighted, focused, and/or laid out forms. The selected time is generally represented in a form to indicate that the time was selected. Event information of the event region may include letters, symbols, and/or numbers. In addition, contents, such as a cartoon, a graphic, a photograph, a program, an icon, or any combinations thereof may be output according to the event information.

If the event information includes a plurality of identical event information, it may be bundled and output accordingly in the event region, together with the number of pieces (or a number that indicates the number of items) of the event information. Therefore, the difficulty of displaying event information on the screen due to an excessive number of events can be reduced. For example, if ten text messages are received from the same entity (or a common sender), event information regarding the ten text messages may not be separately displayed. Instead, the number that indicates the number of received text messages may be displayed so that the event information can be processed in one block (or sub-event region) of the event region.

Other regions are also parts of various aspects of the present invention. For example, aspects of the present include a title region. In the case of an event notification indicator of the title region, if a user registered, for example, a birth date in a schedule management menu of the mobile communication terminal, the user may be notified of the birthday at the registered date through a predetermined contents (or indicator) such as a mark or an icon in the shape of a cake.

One or more screen configurations and one or more functions of each of the regions will be described in greater detail later with reference to FIGS. 3 through 9. Prior to such discussions, an event display method will be described with reference to FIG. 2.

In various non-limiting aspects, the term 'unit' may be expressed as 'module.' The term 'module,' as used herein, refers to, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 2:
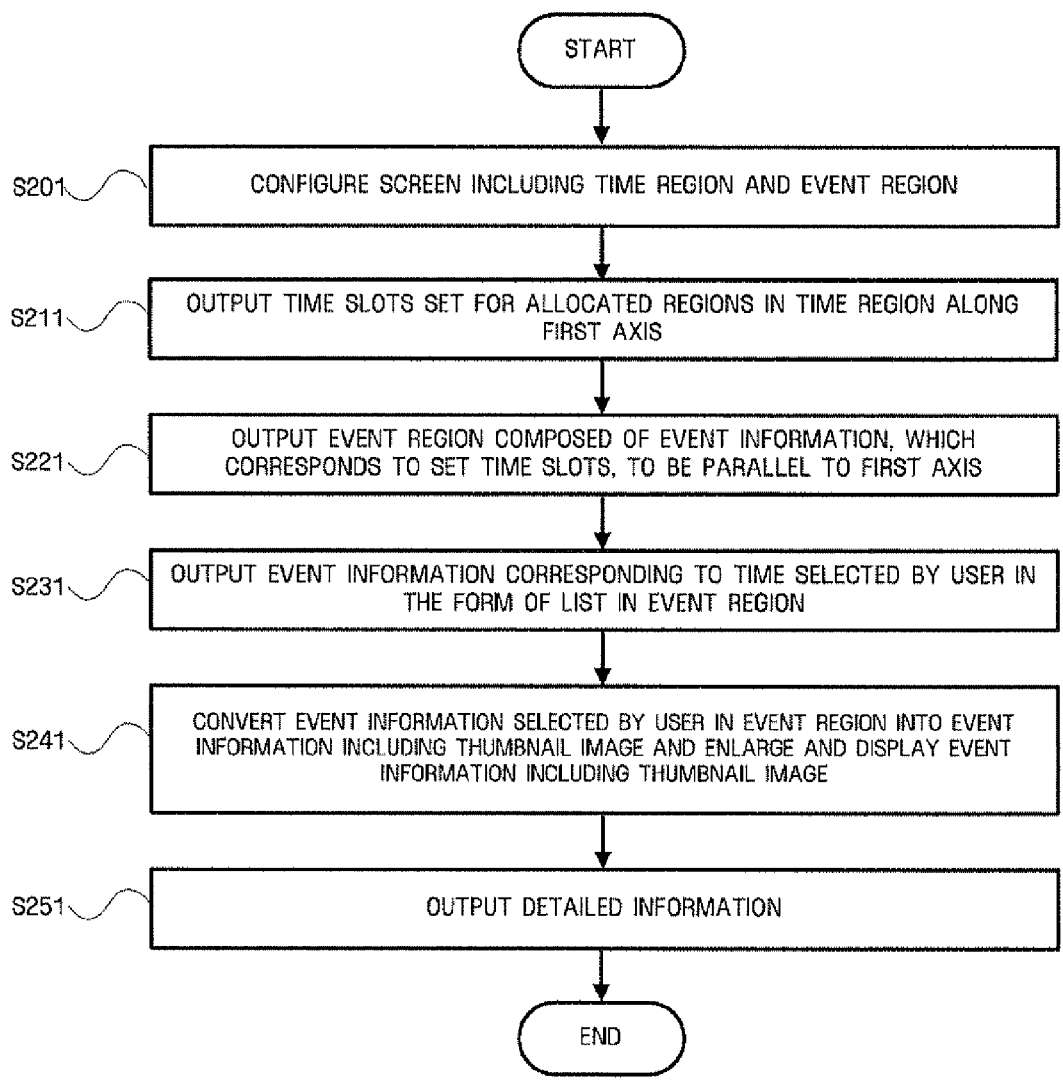
FIG. 2 is a flowchart illustrating an event display method of a mobile communication terminal according to an aspect of the present invention.

FIG. 2 is a flowchart illustrating an event display method of a mobile communication terminal according to an aspect of the present invention. First of all, a screen of the mobile communication terminal, for example, is configured by the configuration unit 110 in operation S201 to include (or simply includes) a time region and an event region. The time region is divided by time intervals along a first axis into a plurality of sub-time regions. The event region is divided by event into a plurality of sub-event regions, in parallel to the first axis. For example, event information may be displayed in each corresponding sub-event region of the event region using a plurality of axes (first and second axes). The first axis may include event and/or scroll regions. The second axis may include state, title and/or information regions. In other aspects, other regions, something similar, or combinations thereof, for the first and second axes are within the scope of the present invention.

Times slots set for allocated zones are output in the respective sub-time regions of the time region along the first axis. The sub-event regions are composed of (or comprise) event information that correspond to the time slots. The sub-event regions are output parallel to the first axis (operations S211 and S221). As shown, sub-time regions, which do not have corresponding event information, are deactivated and output accordingly. In addition, sub-event regions, which are composed of (or comprise) event information that correspond to times (time frames or time frames) unselected by a user, are deactivated and output accordingly.

If the user selects a time (time slot or time frame) in the time region, event information that correspond to the selected time is arranged in the form of a list and output in the event region of the output unit 130 (operation S231). If the event information includes a plurality of identical event information, the plurality is bundled and output accordingly in the event region, together with the number of pieces (or a number indicating the number) of the event information. Therefore, the difficulty of displaying event information on the screen due to an excessive number of events can be reduced. Though described as identical, it is understood that the event could be identical, but the contents of the event are not identical such as when the event is a plurality of messages.

Event information selected by the user in the event region is converted into event information that includes a thumbnail by using the conversion unit 120, and the event information that includes the thumbnail is enlarged and displayed accordingly (operation S241). The thumbnail image is a smaller and more concise version of an original image (a digest and/or a representation of the event information) and enables a viewer to guess the content of a corresponding event and/or event information. For example, when a text message is received from an entity (or a sender), and if information regarding the event (i.e., the text message) is selected, a picture of the entity (or the sender) may be provided in the form of a thumbnail image. In this case, first event information at a time (time slot or time frame) selected by the user may be converted into event information that includes a thumbnail and is displayed accordingly. In addition, whenever the user moves between event information, an existing list (or event information which did not include a thumbnail) is converted into event information that includes a thumbnail image and is displayed accordingly. Event information, which is not selected by the user, is converted back to the simple list and displayed accordingly, though not required.

Then, if the user clicks on the event information, detailed information of the event information is output on the output unit 130 (operation S251). For example, if the user purchased a book online through micro-payment (small or online payment), detailed information thereof (such as the title and price of the book) may be output. In the case of a text message, the name and/or telephone number of a sender (or an entity) may be output as the detailed information.

Hereinafter, the screen configuration, one or more functions of each region, and an output screen will be described in greater detail with reference to FIGS. 3 through 9. FIG. 3 illustrates screen configuration of a mobile communication terminal according to an aspect of the present invention. A limited screen size of a mobile communication terminal (e.g., a mobile phone) has regions of information that are allocated in order to effectively represent the information. In the non-limiting aspects shown, information regarding each event may be displayed in each of the allocated regions using (or extending in) a plurality of axes (or directions) (first and second axes). The first axis may include event and/or scroll regions, and the second axis may include state, title, and/or information regions, though not required. Here, the configuration of each region may vary according to various configuration methods, and various combinations thereof are all within the scope of the invention.

Referring to FIG. 3, a screen includes a time region 310, which is divided in intervals of time. The screen includes an event region 320, which is divided by events. The time region 310 and the event region 320 are parallel to the first axis. The time region 310 may include one or more blocks. In the non-limiting aspect as shown, 12 blocks are shown by way of example. The event region 320, in which event information is displayed, may include one or more blocks. In the non-limiting aspect as shown, 8 blocks are shown by way of example. Each block of the time region 310 is filled (or occupied) with a time slot. In the non-limiting aspect shown, a ratio of the size of each block of the event region 320 to that of a corresponding block of the time region 310 is 1.5 to 1. Accordingly, event information can be effectively represented in each block of the event region 320 that corresponds to a block of the time region 310. However, it is understood that other ratios can be used.

In addition, a block 322, in which a thumbnail image may be displayed, the event region 320 may be enlarged in such a case, for example, by 1.5 to 2 times the size of a block 324 that is displayed in the form of a list. The blocks of the time region 310 denote sub-time regions into which the time region 310 was divided on the basis of time. The blocks of the event region 320 denote sub-event regions into which the event region 320 was divided on the basis of event.

In non-limiting aspects, the first axis may include the time region 310, the event region 320, and/or the scroll region 330.

In various aspects, one or more zones may be allocated to the time region 310, and a time slot may be set for each of the zones. For example, if two zones are allocated to the time region 310, one or more time slots are set for each of the first and second zones. That is, if the time region 310 includes two zones, the 24 hours of one day are divided into the two time zones. Therefore, time slots between 06:00 a.m. and 17:00 (or 17:59) p.m. may be set (or allocated) to the first zone, and a time slot between 18:00 p.m. and 05:00 (or 05:59) a.m. may be set (or allocated) to the second zone.

In this non-limiting aspect, only the time slots set for any one of the first zone or second zone in the time region 310 may be output (or displayed) along the first axis, though not required. Alternatively, part of the time region 310 may be allocated to (or display) the first or second zone, and/or a plurality of the zones may be displayed together in the time region 310.

In other aspects, if the time region 310 includes (or have been allocated) three zones, the blocks of the time region 310 may become larger than when the time region 310 includes (or have been allocated) two zones. In other words, because the 24 hours of one day are divided into three zones, the time region 310 may increase the output and/or displayable size of the blocks (or the time slots) of the time region 310 and still fit in each of the three zones. Further, in accordance with the size increase of the blocks of the time region 310, the sizes of the event blocks of the event region 320 may also be adjusted. That is, the sizes of the blocks of the event region 320 may also vary according to the number of zones allocated to the time region 310.

In the output time region 310, sub-time regions that do not have corresponding event information are deactivated and output (or displayed) accordingly. Therefore, the deactivated blocks (or sub-time regions) are not selected by a user, and a scroll bar is configured to move directly to a next block (an activated block) having event information.

Next, the event region 320 outputs (or displays) event information, which has been generated during a time slot of one of the zones of the time region 310, parallel to the first axis. If the user selects a time (or a time slot) in the time region 310, event information corresponding to the selected time (or the time slot) is arranged in the form of a list and output (or displayed) accordingly.

In addition, if the user selects one of the event information in the event region 320 (and/or the list), the selected event information is converted into an event information that includes a thumbnail, and the event information that includes the thumbnail is enlarged and displayed accordingly. In a non-limiting aspect, the thumbnail image is a smaller and a more concise version of an original image and enables a viewer to guess the content of a corresponding event. In other aspects, the thumbnail is a smaller and a more symbolic representation of an original image and/or information of the event of the time slot.

In the non-limiting aspect shown, the screen may also include the scroll region 330. Therefore, if not all of the event information in the event region 320 can be displayed on the screen, the user may view the non-displayed event information by moving the scroll bar in the scroll region 330. Since the scroll bar functions as a guide to help the user check the event information, the scroll bar may be used to freely move between the event information. In various aspects, the scroll bar need not be only in the scroll region 330. In other aspects, the scroll bar and/or the scroll region 330 need not be displayed, or displayed constantly.

In the non-limiting aspect shown, the second axis may include a state region 340, a title region 350 and/or an information region 360.

For example, the state region 340 may include a signal condition indicator, a battery indicator, a time indicator, something similar, or any combinations thereof. The title region 350 may include an event notification indicator, a generation time indicator of event information, a weather indicator, something similar, or any combinations thereof. In addition, the information region 360 may include the time, event, and/or scroll regions 310, 320, and 330 of the first axis, something similar, or any combinations thereof. In various aspects, items for the state, title, and/or information regions 340, 350, and 360 may include various components, indicators, something similar, or any combinations thereof.

Figure 4:
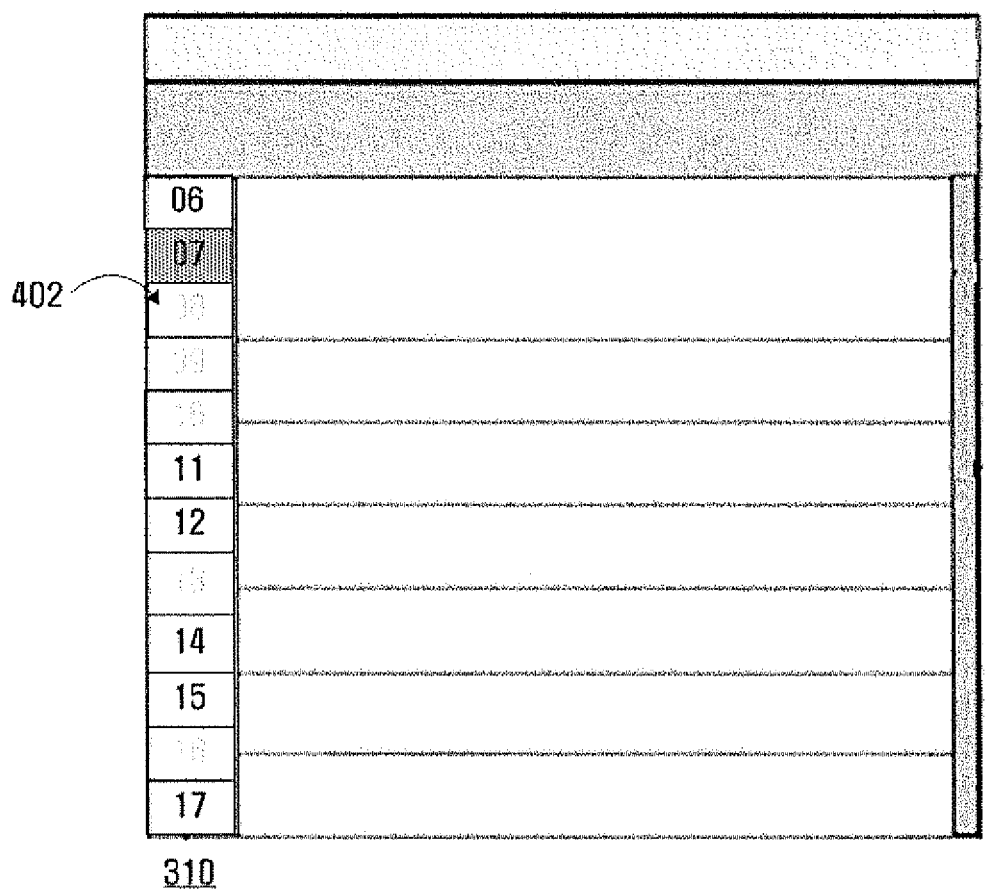
FIG. 4 illustrates a time region of a screen according to an aspect of the present invention.

The time region 310 will now be described in greater detail with reference to FIG. 4. FIG. 4 illustrates a time region 310 of a screen according to an aspect of the present invention. Referring to FIG. 4, a plurality of zones are allocated to the time region 310, and one or more time slots are set (or allocated) for each zone. For example, if two zones are allocated to the time region 310, one or more time slots between 06:00 a.m. and 17:00 (or 17:59) p.m. are set (or allocated) for a first zone. One or more time slots between 18:00 p.m. and 05:00 (or 05:59) a.m. are set (or allocated) for a second zone (not shown). In addition, a user may set (or allocate) zones that are to be allocated to the time region 310 and allocate (set) an equal number of time slots of a day to the number of zones, e.g., two or three zones, respectively. A specific screen to set zones and time slots for the zones will be described in greater detail later with reference to FIG. 5. Accordingly, a detailed description thereof will not be discussed here. While not shown, the number of zones can have unequal sizes, such as when one zone corresponds to a work time during which events are more likely to occur, and a remaining zone for a remaining time during which events are anticipated.

As shown, in the output time region 310, sub-time regions that do not have corresponding event information are deactivated and output (or displayed) accordingly. Therefore, the deactivated blocks (or sub-time regions) are not selected by a user, and a scroll bar is configured to move directly to a next block that has event information.

In the non-limiting aspect shown in FIG. 4, the times (or blocks) without occurred events may be dimly (or differently) represented, and thus deactivated as indicated by reference numeral 402 in order to distinguish such times without occurred events from times with occurred events. Additionally, times with occurred events and which are selected by a user may be represented in (or indicated by) various forms. Some of such forms including being highlighted, focused, laid out, or any combinations thereof, in order to indicate that the times (blocks) have been selected.

If a current zone (or a zone that is currently output or displayed) is changed to another zone (e.g., from the first zone to the second zone), the time slots set (or allocated) for the current zone may all be changed to time slots set (or allocated) for the new zone, and the time slots set (or allocated) for the new zone may be output (or displayed) accordingly on the screen. For example, time slots between 06:00 a.m. and 17:00 (or 17:59) p.m. may be set for the first zone, and time slots between 18:00 p.m. and 05:00 (or 05:59) a.m. may be set for the second zone.

In various non-limiting aspects, the time region 310 may include 12 blocks, and/or an event region may include 8 blocks, but the invention is note limited thereto. Also, a ratio of the size of each block of the time region 310 to that of a corresponding block of the event region 320 may be 1.5:1, but this is not required in all aspects. In this case, if a user moves from a last time block (i.e., the block of 17:00 p.m.) of the first zone to the second zone (or one of the blocks of the second zone) using a down key, a change of zones is performed, an existing time slot (or current time slot that is output or displayed) is changed to a time slot set for the second zone, and the time slot set for the second zone is output in the time region 310. Similarly, if the user moves from the block of 18:00 p.m. in the second zone to the first zone (or one of the blocks of the first time zone) using an up key, the time slot set for the second zone (or current time slot that is output or displayed) is changed to the time slot set for the first zone. It is understood that the number of the blocks of the time region 310 may be other than 12, the number of the blocks of the event region 320 may be other than 8, and the block size ratio may be other than 1.5:1.

In addition to the up/down key (that is, the up and/or down key), a scroll format may be used to change the zones. Alternatively, the user may directly select a zone, such as the first or second zone, using a predetermined menu and move to a desired time slot directly. In various aspects, such selection and movement may occur by pressing a keypad, one or more buttons, a touchpad, a touch screen, a click wheel, and/or something similar.

After the user moves to (or through) all time slots for a day, the date is changed, and the time slots for a next day start. For example, if the user moves to 23:00 p.m. (or its block or time slots) and clicks on the down key, the date is changed to the following day, and corresponding event information are output in each of the one or more time slots of the following day.

Figure 5A:
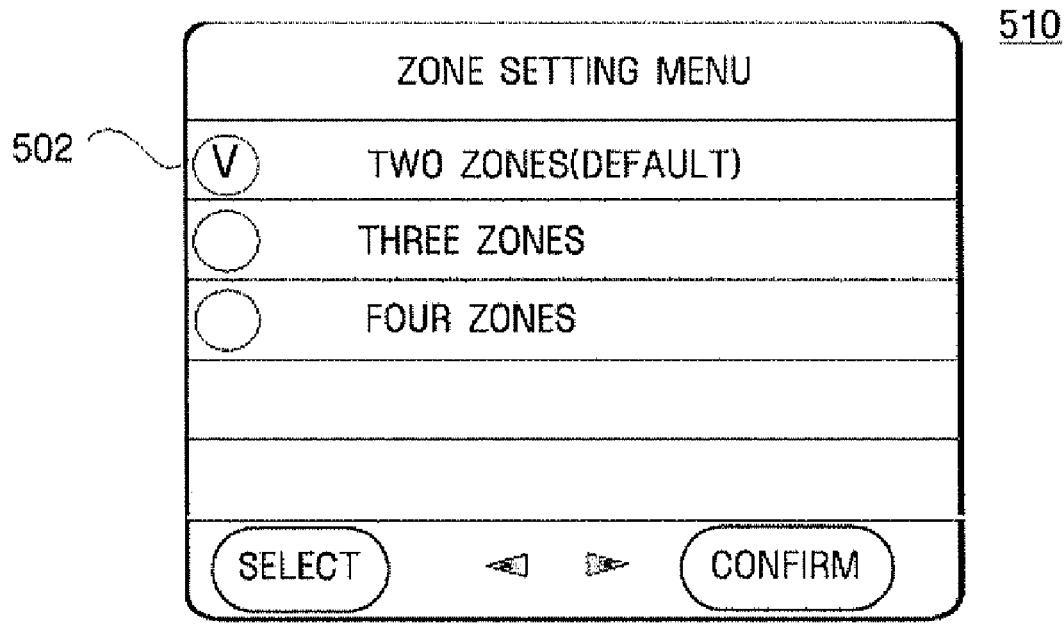
FIGS. 5A and 5B respectively illustrate a screen to set zones and a screen to set time slots of a time region according to an aspect of the present invention.
Figure 5B:
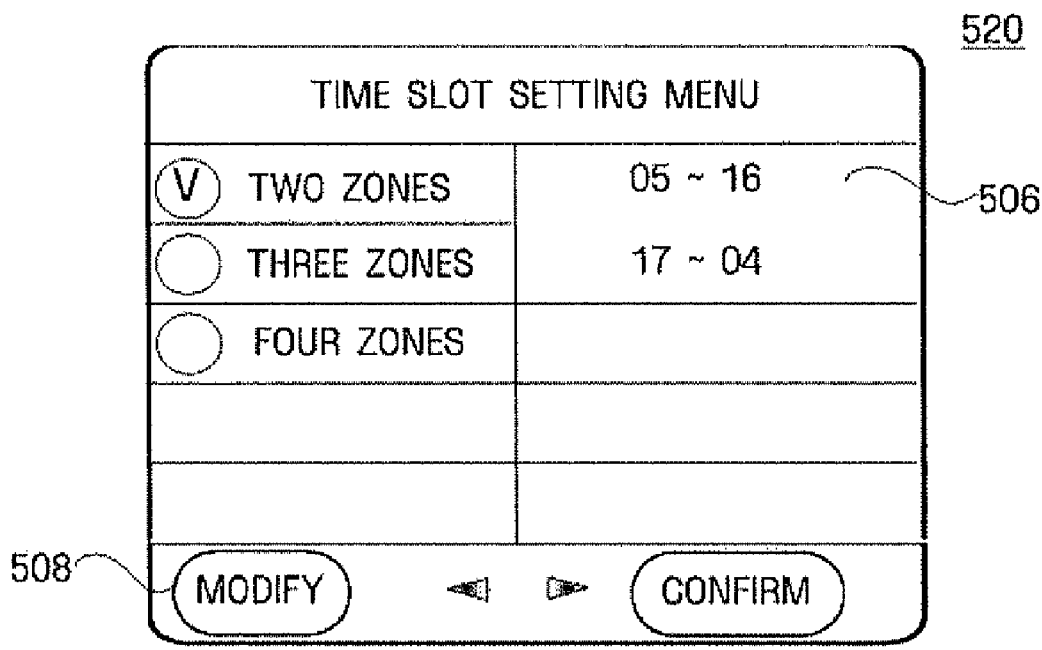

The zones and time slots of the time region 310 may be arbitrarily (or selectively) set by the user as illustrated in FIG. 5A and FIG. 5B. FIGS. 5A and 5B respectively illustrate a screen to set zones and a screen to set time slots of a time region according to an aspect of the present invention. Referring to FIG. 5A, a user may allocate (or set) a desired number of zones of the time region using a zone setting menu 510. If the user does not set (or allocate) the zones, two zones 502 may be set by default. In addition, the user may set the time slot of a day for the plurality of zones. For example, if the user desires to set times slots of the day to morning, afternoon, and evening, the user may select and store three zones to correspond. If the user desires to set the time slots of the day to dawn, morning, afternoon, and evening, the user may select and store four zones to correspond.

Referring to FIG. 5B, time slots set for the allocated zones illustrated in FIG. 5A may be adjusted using a time slot setting menu 520. For example, when the zone setting of the time slots of FIG. 5A sets up two zones, then the time slots for the two zones 502 may be set between 06:00 a.m. and 17:00 (or 17:59) p.m. and between 18:00 p.m. and 05:00 (or 05:59) a.m., respectively. In this case, if the user changes (or adjusts) the time slots using a 'Modify' button 508 to time slots of between 05:00 a.m. and 16:00 (or 16:59) p.m., and between 17:00 p.m. and 04:00 (04:59) a.m., respectively, as indicated by reference numeral 506, the new time slots are sequentially stored in (or applied to) the first and second zones and set as the time slots for the two zones 502. A menu to allow the user to directly adjust the time slots or to select predetermined time slots may be provided. In various aspects, when the time slots of one or more of the zones are selected, the time slots of the remaining zones may be automatically adjusted based on a default setting or other predetermined settings. In various aspects, change in the time slots that would result in gaps or overlap may be prohibited or warned.

In other aspects, the number of zones may be increased (e.g., five zones) using a predetermined menu to enable the user to allocate a greater number of zones to the time region 310.

Figure 6:
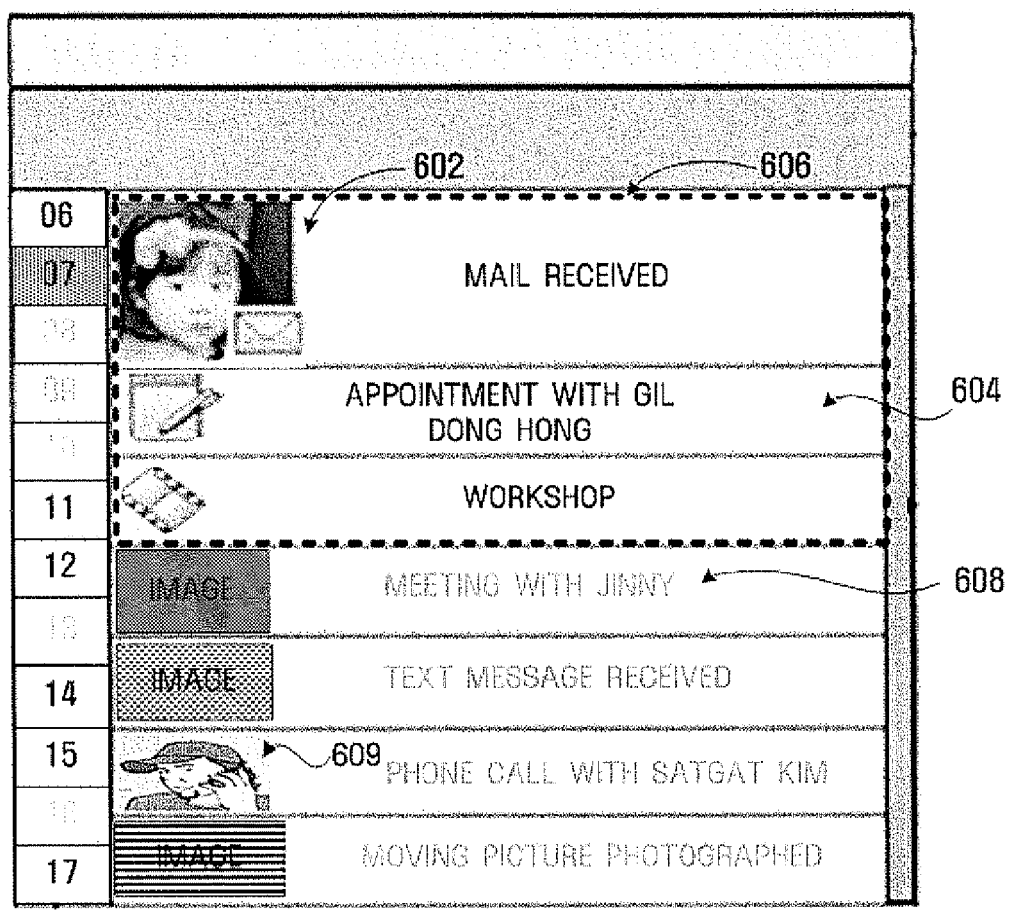
FIG. 6 illustrates an event region of a screen according to an aspect of the present invention.

FIG. 6 illustrates an event region 320 of a screen according to an aspect of the present invention. As shown, if a user selects a time at which an event occurred from the time region 310, event information that correspond to the selected time is output in the event region 320. That is, the event region 320 outputs information of events that occurred during the time slots set for the corresponding zone of the time region 310. For example, when the time region 310 includes two zones and times slots set for the two zones are between 06:00 a.m. and 17:00 (or 17:59) p.m. and between 18:00 p.m. and 05:00 (or 05:59) a.m., respectively, and if the user selects a time (e.g., 07:00 a.m.) that includes a corresponding event information, the relevant event information is output (displayed) in the event region 320.

In addition, the event region 320 outputs the information regarding the events that occurred during the corresponding time slots set for the corresponding zone of the time region 310, in parallel to the first axis. If the user selects a time (that is, a time block or a time slot) in the time region 310, event information that corresponds to the selected time (or time block) is arranged in the form (or the format) of a list 604 and output accordingly in the event region 320. Sub-event regions (or other portions of the event region 320), which include event information corresponding to times (or time block)

unselected by the user, are deactivated as indicated by reference numeral 608 and output also in the form of the list 604.

In addition, in the non-limiting aspect shown, event information selected by the user in the event region 320 is converted into event information including a thumbnail 602, and the event information including the thumbnail 602 is enlarged and displayed accordingly. As shown, the thumbnail image 602 is a smaller and a more concise version of an original image and enables a viewer to guess the content of a corresponding event. For example, when a text message is received from an entity, if information regarding the event, i.e., the text message, is selected, a picture of the entity may be provided in the form of a thumbnail image. In various aspects, the thumbnail is a digest or a representation of the event information)

In this case, first event information of a time selected by the user may be converted into event information that include the thumbnail 602 and be displayed accordingly. In addition, whenever the user moves between event information, an existing list is converted into the event information that includes the thumbnail image 602 and be displayed accordingly. Event information, which is not selected by the user, is converted back to the format of the list 604 and displayed accordingly, though not required.

Therefore, as the user moves to from one event information to another, the event information represented in the form of the list 604 is converted into the thumbnail image 602, and the thumbnail image 602 is enlarged and displayed accordingly. A block for a selected event information may be 1.5 to 2 times the size of a block for unselected event information of the event region 320. Event information of the event region 320 may include letters, symbols, numbers, graphics, or any combinations thereof. In addition, contents, such as a cartoon (or a graphic) 609, a photograph, an icon, or any combinations thereof, may be output according to the event information. An image of the cartoon 609 may be generated, received online, and/or stored in a mobile communication terminal and may be provided in various forms according to the event information. In particular, various (or diverse) images of the cartoon 609 may be provided for the same event information (e.g., a text message) (and/or the same type event information), thereby satisfying emotional needs of the user.

Such a graphic screen enables the user to view sent, received, and/or generated event information more conveniently. In addition, when the event information displayed in the form of the list 604 is selected, the image is converted into the thumbnail image 602, to thereby enhance readability of the image by the user.

The shown event region 320 to output event information is formed of a plurality of blocks (e.g., 8 blocks), and each block of the event region 320 is capable of outputting event information. In this case, if three pieces of event information were generated at 07:00 a.m., two pieces of event information at 11:00 a.m., and two pieces of event information at 12:00 p.m., blocks for the event information generated at the currently selected time (or time frame) may be bundled (or shown together) using a predetermined identification form (e.g., a frame 606) and be distinguished from blocks of event information generated at other times. In this case, the event information generated at the times other than the selected time may be deactivated (or dimmed or otherwise made distinguishable) as indicated by reference numeral 608 in order to prevent it from being selected and to distinguish it from the event information generated at the selected time. Therefore, not only the event information generated at the selected time but also the event information generated at the unselected times may all be displayed in the blocks of the event region 320, to thereby enhance the efficiency of managing the event information.

If the user selects one of the event information from the frame 606, the event region 320 goes one depth deeper (or one step further) and outputs detailed information of the selected event information. The detailed information may be output in various forms according to an event. For example, if the user purchased a book online through a micro-payment (a small or online payment) arrangement, the title and price of the book may be displayed as the detailed information of the selected event information. In the case of a text message, the name and telephone number of a sender may be output as the detailed information of the selected event information. In various aspects, other event information are within the scope of the present invention.

Figure 7:
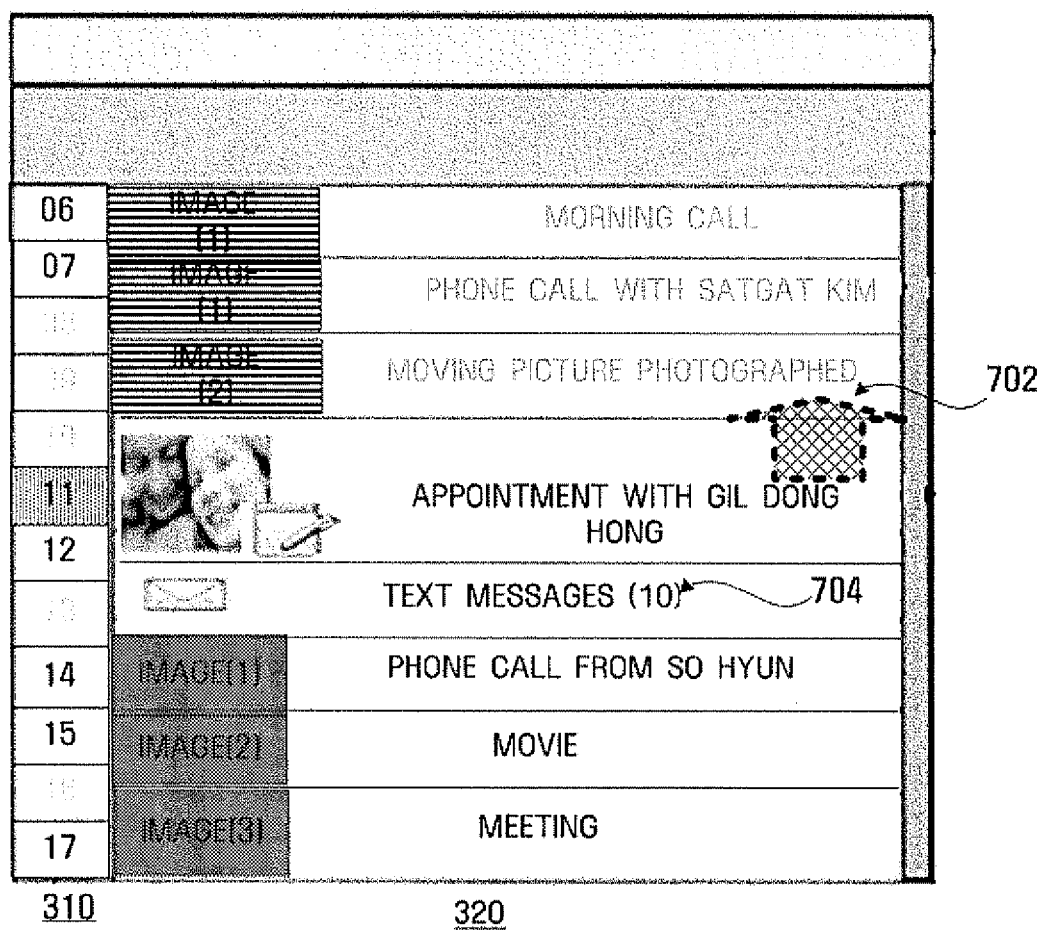
FIG. 7 illustrates a method of moving between event information and displaying the event information in an event region according to an aspect of the present invention.

FIG. 7 illustrates a method of moving between event information and displaying the event information in an event region 320 according to an aspect of the present invention. For example, a time (a time frame, a time block, and/or a time slot) selected by a user may be 11 o'clock, and a plurality of event information that corresponds to 11 o'clock may be output (or displayed) in the event region 320. In this case, if the user moves between the event information within the selected time using a down key, the event information is sequentially pushed upward to an upper part of the event region 320 as indicated by reference numeral 702. Further, it was discussed above that when there is event information that has been generated before 11 o'clock, the event information is deactivated and displayed accordingly. Accordingly, when the user moves between the event information generated at 11 o'clock, which is currently selected by the user, using the down key, the event information in the 11 o'clock time is pushed upward as indicated by reference numeral 702. Additionally, the deactivated event information of the other time is also sequentially pushed upward. Here, the various event information may be pushed upward (or a first direction, or downward, or a second direction) whenever the user moves between the event information. Alternatively, when the number of pieces of event information that can be displayed in the event region 320 exceeds a predetermined number or when the user moves from last event information of the event region 320 using the down key, the event information may be moved upward. In various aspects, the movement thereof need not be in up or down directions, but include left and right directions. Accordingly, the movement may be any four directions, or combinations thereof (i.e., diagonal).

As described above, since event information that corresponds to a time selected by a user is displayed, the user can intuitively check the event information that corresponds to the selected time. Also, the event information can be displayed by making the most (or maximizing the display area) of the screen.

If the event information is a plurality of identical information (or identical type of information), it is bundled and output accordingly in the event region 320, together with the number of pieces (or the number items) of the event information. Therefore, the difficulty of displaying event information on the screen due to an excessive number of events can be reduced. For example, if ten text messages are received from the same entity, event information regarding the ten text messages may not be separately displayed. Instead, the event information may be bundled and output in one block of the event region 320, together with the number 704 indicating the number of items of the text messages.

Various bundling configurations can be implemented. For example, the bundling can be implemented in units of calling or called parties, telephone numbers, and identical text messages which may be preset (or predetermined). Therefore, when corresponding event information is generated, it may be processed (or bundled) as one block. In other aspects, things similar to the calling or called parties, telephone numbers, and identical text messages are within the scope of the present invention.

Figures 8A, 8B:
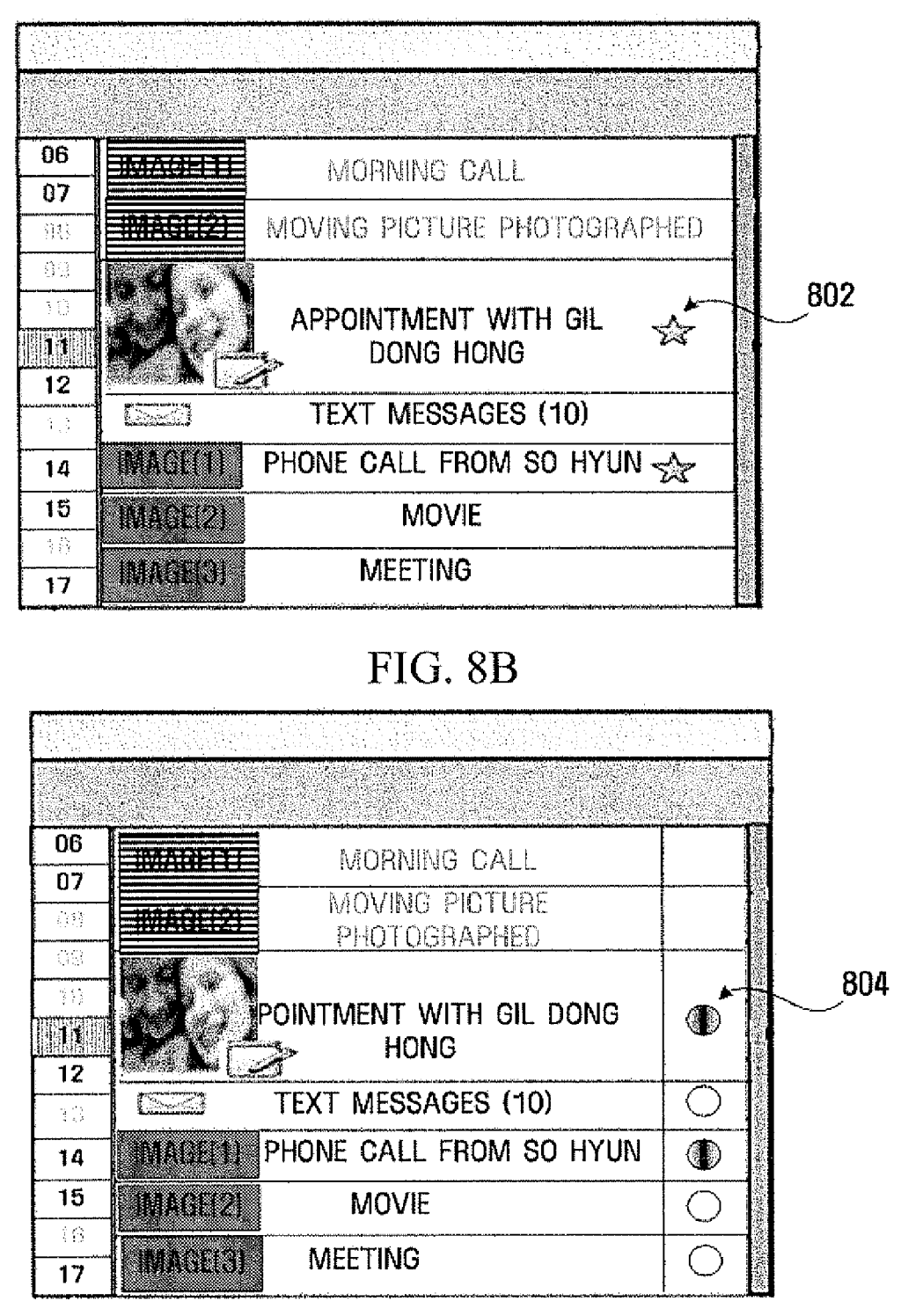

FIGS. 8A and 8B illustrate screens to set preference marks according to aspects of the present invention. Referring to FIG. 8A, a user may give significance (or indicate importance) to desired event information using a preference mark (e.g., an asterisk 802). For example, the user may mark event information generated by a certain entity (or a sender) as preferred (or important) event information, sort a corresponding screen, bundle the marked event information, and display the bundled event information, for example, to be output or displayed together. Alternatively, the user may output the marked event information separately from other event information (such as those without the preference marks) using a predetermined menu.

To put (or apply) the preference mark, the user may click on the desired event information and put (or apply) an image (or a mark, e.g., the asterisk 802) on the event information using a preference menu. Alternatively, the user may select and set information regarding a certain entity and/or a telephone number in advance. Thus, if event information that corresponds to the set information is generated, the preference mark may be automatically assigned (or set) to the event information. In a non-limiting aspect, a plurality of preference marks (or of different types) may be assigned to event information in order of priority, to thereby rank the event information in order of importance and/or priority (e.g., first and second ranks). The event information may be sorted and output according to the user's choice (or selection). Alternatively, event information of a predetermined rank may be output. That is, the user may assign predetermined ranks to certain events so that the events may be automatically marked as received according to the predetermined ranking.

Referring to FIG. 8B, apart from assigning an image (asterisk) to the event information in order to mark the event information as preferred (or important) as illustrated in FIG. 8A, a user may simply click a selection item (or a selectable item) 804 (which may be pre-displayed) to mark the corresponding event information as preferred or desired. Thereafter, as described above with reference to FIG. 8A, the marked event information may be output separately from other event information. Alternatively, the event information may be sorted and output accordingly.

Accordingly, the user can selectively distinguish desired event information from a plurality of other event information and choose to check only the desired event information. Consequently, the inconvenience of having to check event information with low significance individually can be reduced, to thereby facilitate economical and efficient information management thereof.

Figure 9:
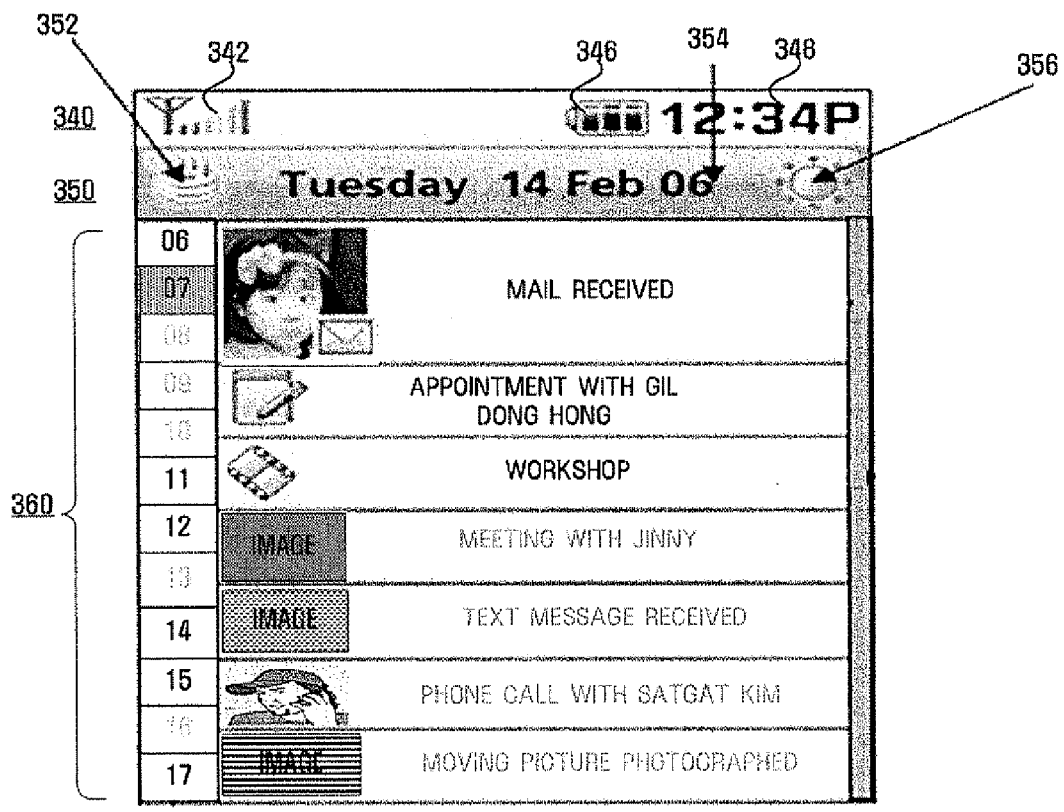
FIG. 9 illustrates state and title regions of a screen according to an aspect of the present invention.

FIG. 9 illustrates state and title regions 340 and 350 of a screen according to an aspect of the present invention. In the non-limiting aspect shown, the state region 340 includes a signal condition indicator 342, a battery indicator 346, and a time indicator 348. The title region 350 includes an event notification indicator 352, a generation time indicator of event information 354, and a weather indicator 356. In addition, an information region 360 includes time, event, and scroll regions 310, 320, and 330 of the first axis as discussed above. In various aspects, other indicators are within the scope of the present invention.

The signal condition indicator 342 of the state region 340 indicates a current receiving condition of a receiving area, and the battery indicator 346 indicates the remaining power of a battery of a mobile communication terminal, and the time indicator 348 indicates a current time.

The event notification indicator 352 of the title region 350 notifies (or displays) an event day (or information on the significance of the day). For example, if a user registered (or selected previously) a birth date (or birthday) in a schedule management menu of the mobile communication terminal, the user may be notified of the birthday at the registered date through predetermined contents (or indicators) such as a cake mark. The generation time indicator 354 of event information indicates the generation date of the event information of the event region. That is, Mar. 30, 2006 is displayed in the case of the event information that is generated on Mar. 30, 2006.

A date menu (e.g., a calendar) or a control key (an up/down/left/right key) of the mobile communication terminal may be used to change a date. For example, a click on the right button may increase the date, and a click on the left button may decrease the date. Therefore, if the date is changed, event information that corresponds to a new date may be arranged and output (displayed) in the event region, though not required. In other aspects, various other ways of changing the date may be used.

While not required in all aspects, elements of the method can be implemented as software and/or firmware for use with one or more processors and/or computers. Moreover a processor and/or computer readable medium maybe encoded with computer and/or processor-executable instructions for performing the method.

In various aspects, the event information may be sent, received, and/or generated. In various aspects, times of the event information may be when the event information is sent, received, and/or generated.

In various aspects, selection or input by a user may be performed through a keypad, one or more buttons, a touchpad, a touch screen, a roller wheel and/or ball, a touch pen, and/or something similar.

In various aspects, various types of event include a text message, information regarding a micro-payment, photographic information, schedule management, telephone number, and/or an address.

In various aspects, various event information in the event region may be in color, varying grayscale, varying shading, sounds, something similar, or any combinations thereof.

As described above, an event display apparatus and method according to the present invention enable a user to more effectively utilize event information, to thereby enhance efficiency and convenience in managing personal records.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:
1. An event display apparatus comprising:
a configuration unit to configure a screen to include a time region, which is divided by time intervals along a first axis into a plurality of sub-time regions, and an event region, which is divided by event into a plurality of sub-event regions, in parallel to the first axis; and
an output unit to output time slots, which have been allocated according to one or more zones, in the respective sub-time regions along the first axis, and to output sub- event regions comprising event information of different types, which correspond to the output time slots, in parallel to the first axis, wherein the event information that corresponds to one of the time slots selected by a user is arranged in the form of a list in the event region, and the corresponding event information in the event region is enlarged and displayed;

wherein the size of each of the sub-time regions varies according to the number of zones, the size of each of the sub-event regions varies according to the number of time slots, and the number of zones and the number of time slots are selectively or arbitrarily set by the user; and wherein, if the event information includes a plurality of events marked by a preference mark, the plurality of marked events is bundled and output together by the output unit.

2. The apparatus of claim 1, wherein sub-time regions without corresponding event information among the output sub-time regions are deactivated and output as a deactivated time.

3. The apparatus of claim 1, wherein sub-event regions corresponding to time slots unselected by the user are deactivated and output as a deactivated event.

4. The apparatus of claim 1, wherein the enlarged and displayed corresponding event information comprises a thumbnail image.

5. The apparatus of claim 4, wherein, if the event information includes a plurality of identical information, the plurality of identical information is bundled and output as one event information.

6. The apparatus of claim 1, wherein, if one of the zones is changed from a first zone to a second zone, the output unit outputs corresponding time slots allocated to the second zone instead of the time slots of the first zone.

7. An event display method comprising:

configuring a screen to include a time region, which is divided by time intervals along a first axis into a plurality of sub-time regions, and an event region, which is divided by event into a plurality of sub-event regions, in parallel to the first axis;

outputting time slots, which have been allocated according to one or more zones, in the respective sub-time regions along the first axis;

outputting sub-event regions comprising event information of different types, which correspond to the output time slots, in parallel to the first axis;

arranging the event information that corresponds to one of the time slots selected by a user in the form of a list in the event region; and enlarging and displaying the corresponding event information in the event region, wherein the size of each of the sub-time regions varies according to the number of zones, the size of each of the sub-event regions varies according to the number of time slots, and the number of zones and the number of time slots are selectively or arbitrarily set by the user; and wherein, if the event information includes a plurality of events marked by a preference mark, the plurality of marked events is arranged and displayed together.

8. The method of claim 7, further comprising deactivating and outputting sub-time regions without event information among the output sub-time regions as a deactivated time.

9. The method of claim 7, further comprising deactivating and outputting sub-event regions comprising event information, which corresponds to time slots unselected by the user as a deactivated event.

10. The method of claim 7, wherein the enlarged and displayed corresponding event information comprises a thumbnail image.

11. The method of claim 10, further comprising bundling and outputting the identical information as one event information if the event information includes a plurality of identical information.

12. The method of claim 7, further comprising outputting corresponding time slots allocated to a second zone instead of the time slots of a first zone if one of the zones is changed from the first zone to the second zone.

13. A method of displaying one or more events on a display, comprising:

arranging one or more events of different types according to at least one predetermined time slot that corresponds to a time when the one or more events occurred; and displaying the one or more events of different types in an event slot that corresponds to the at least one predetermined time slot, wherein the displaying of the one or more events includes enlarging the event slot;

wherein the size of each of the at least one predetermined time slots varies according to a number of zones, the size of the event slot varies according to the number of the at least one predetermined time slots, and the number of zones and the number of predetermined time slots are selectively or arbitrarily set by a user; and wherein, if the one or more events includes a plurality of events marked by a preference mark, the plurality of marked events is arranged and displayed together.

14. The method of claim 13, wherein the event occurs when the event is generated, received, and/or sent.

15. The method of claim 13, wherein the one or more events are at least one of a text message, information regarding a micro-payment, photographic information, schedule management, telephone number, video, audio, calls, and/or an address.

16. The method of claim 13, wherein the at least one predetermined time slot corresponds to one of the hours of a day.

17. The method of claim 13, wherein the displaying of the one or more events includes displaying a representation of the event information.

18. The method of claim 13, wherein any same type events of the one or more events are bundled.

19. The method of claim 18, wherein the same type of events include text messages, emails, and/or calls.

20. An apparatus to display one or more events on a display, comprising:

an arranging unit to arrange one or more events of different types according to at least one predetermined time slot that corresponds to a time when the one or more events occurred; and a displaying unit to display the one or more events of different types in an event slot that corresponds to the at least one predetermined time slot, wherein the event information that corresponds to one of the time slots selected by a user is arranged in the form of a list in the event region, and the corresponding event information in the event region is enlarged and displayed;

wherein the size of each of the at least one predetermined time slots varies according to a number of zones, the size of the event slot varies according to the number of the at least one predetermined time slots, and the number of zones and the number of predetermined time slots are selectively or arbitrarily set by the user; and wherein, if the event information includes a plurality of event information marked by a preference mark, the plurality of marked event information is arranged and displayed together.

21. The apparatus of claim 20, wherein the event occurs when the event is generated, received, and/or sent.

22. The apparatus of claim 20, wherein the one or more events are at least one of a text message, information regarding a micro-payment, photographic information, schedule management, telephone number, video, audio, calls, and/or an address.

23. The apparatus of claim 20, wherein the at least one predetermined time slot corresponds to one of the hours of a day.

24. The apparatus of claim 20, further including a representation of the event information displayed in the event slot.

25. The apparatus of claim 20, wherein any same type events of the one or more events are bundled.

26. The apparatus of claim 25, wherein the same type of events include text messages, emails, and/or calls.

27. The apparatus of claim 20, wherein the apparatus is a handheld device.

28. The apparatus of claim 1, wherein the preference mark may be set for each of the plurality of marked events by the user.

29. The apparatus of claim 1, wherein the preference mark is automatically assigned to the plurality of marked events by the output unit, according to predetermined preference information.

* * * * *